United States Patent [19]

Slusarczuk et al.

[11] 4,316,938
[45] * Feb. 23, 1982

[54] HIGH DENSITY CARBON ADSORBENT COMPOSITE

[75] Inventors: George M. J. Slusarczuk, Schenectady; Ronald E. Brooks, Guilderland, both of N.Y.

[73] Assignee: General Electric Company, Schenectady, N.Y.

[*] Notice: The portion of the term of this patent subsequent to May 6, 1997, has been disclaimed.

[21] Appl. No.: 67,335

[22] Filed: Aug. 17, 1979

Related U.S. Application Data

[63] Continuation of Ser. No. 726,963, Sep. 27, 1976, abandoned.

[51] Int. Cl.³ .............................................. B22F 1/02
[52] U.S. Cl. .................................... 428/403; 210/502; 252/447; 427/216
[58] Field of Search .................... 210/36, 39, 40, 502, 210/503, 679, 694; 252/421, 422, 428, 445, 447, 430; 423/445, 449; 55/74; 427/216; 428/403, 408

[56] References Cited

U.S. PATENT DOCUMENTS 3,574,671  4/1971  Cloran ................................. 427/216
3,909,449  9/1975  Nagai et al. ........................... 210/40

Primary Examiner—Ivars C. Cintins
Attorney, Agent, or Firm—Jane M. Binkowski; James C. Davis, Jr.; Joseph T. Cohen

[57] ABSTRACT

Adsorbent composite composed of a high density substrate particle which is non-reactive under conditions of use and which is encapsulated with adherent activated carbon.

12 Claims, No Drawings

HIGH DENSITY CARBON ADSORBENT COMPOSITE

This is a continuation, of application Ser. No. 726,963, filed Sept. 27, 1976, now abandoned.

The present invention relates to a tailorable adsorbent composite of high specific gravity or density. In one particular aspect, the present adsorbent reduces the normal settling time of carbon powders several fold.

In many waste and wastewater purification and polishing processes, adsorbents are used to remove soluble impurities from solution. The most widely used adsorbent, because of cost, availability and effectiveness, is activated carbon. It is generally used in one of two forms: granular activated carbon and powdered activated carbon. The main practical difference between granular and powdered activated carbon is in adsorption rate and handleability.

The most important factor influencing adsorption rate is particle size of the adsorbent. Although adsorption on an exposed surface is very rapid, on the order of microseconds, the adsorption rate of a carbon particle is diffusion limited. Thus, a small particle having a large surface to volume ratio has much higher adsorption rate than a large particle. With <0.045 mm carbon powder 90% of adsorption is over in the first 15 seconds. With granules of 3 mm to 5 mm in diameter several hours contact time is necessary to reach 90% of capacity. This high adsorption rate of powdered activated carbon makes its use very attractive where long contact times are either not desired or impractical.

Granular activated carbon, the form more widely used at the present time, has the advantage that it can be used in an adsorption bed or in a column for both upflow and downflow operation without particular problems, provided the flow rates are not excessive. Its main disadvantage is the relatively slow adsorption rate necessitating contact times on the order of 30 minutes. Thus, a column has to be made large enough to provide the required contact time, and necessitates the use of large quantities of excess carbon.

Powdered carbon has the great advantage of rapid adsorption rate and cost over granular carbon, but it is difficult to handle and to separate from solution and provisions for settling and/or flocculation have to be made for satisfactory recovery. This cancels the primary advantage obtained from increased adsorption rate. Furthermore, the settled adsorbent is usually quite voluminous, making handling and disposal of it difficult and therefore expensive.

The present invention is directed to an adsorbent with large surface area, i.e., high adsorption rate, and also of high specific gravity, i.e., high settling rate. The present adsorbent is a composite consisting essentially of a substrate or core, which is an inert dense particle, encapsulated or substantially encapusulated with adherent activated carbon.

Briefly stated, the present process comprises providing a substrate particle having a minimum specific gravity of about 2 and a minimum size of about 100 Angstroms in diameter, providing an organic material which is a solid at room temperature and which at a temperature ranging from about 50° C. to about 1000° C. at atmospheric pressure decomposes to yield elemental carbon and gaseous product of decomposition, admixing a plurality of said substrate particles with said organic material to form a substantially thorough mixture, heating said mixture to decompose said organic material yielding elemental carbon and gaseous product of decomposition, and grinding the resulting carbon-substrate particle mass to produce the present magnetic adsorbent composite of predetermined size ranging from about one micron to about 10 millimeters in diameter.

The substrate particle or core portion of the present adsorbent composite is a high density inert material which functions as a weighing agent. It is an insoluble and non-toxic material which is inert under aqueous and oxidizing conditions. Specifically, it is a material which is non-reactive under the conditions used to prepare the adsorbent composite and non-reactive under the conditions of use as an adsorbent. The inert substrate particle has a specific gravity ranging from about 2.0 to about 20, and for most applications the specific gravity ranges from about 2.0 to about 10.0. The substrate particle size ranges from about 100 Angstroms in diameter to about 10 millimeters in diameter. Representative of such substrate materials is very fine sand specific gravity 2.2–2.6, finely ground hematite which is an iron oxide ore with specific gravity 4.9–5.3, and rutile which is a natural titanium dioxide with specific gravity 4.2–5.1, litharge with specific gravity of 9.1 and galena with specific gravity of 7.3–7.6. Typical metal powders useful as substrate materials are zinc specific gravity 7.1, tungsten specific gravity 19.3, tantalum specific gravity 16.6, copper specific gravity 8.9, bismuth specific gravity 9.8 and nickel specific gravity 8.9. Metal alloy powders are also useful in the present invention.

The organic material is an organic compound or polymer which is a solid at room temperature and which decomposes at a temperature ranging from about 50° C. to about 1000° C. to yield elemental carbon and gaseous product of decomposition. Typical of such organic materials is coal tar, pitch, asphalt and various organic polymers and copolymers such as vinylidene chloride copolymers with vinyl chloride or acrylonytrile generally referred to as saran and polyamides generally referred to as nylon.

In carrying out the present process, the substrate particles are admixed with the organic material to form a substantially thorough mixture. The particular amount of organic material used is determined largely by the amount of elemental carbon it yields on decomposition, the amount or thickness of the encapsulating elemental carbon required and the amount and size of the substrate particles. The minimum amount of organic material used is that amount which would insure an amount of elemental carbon sufficient to form at least a continuous coating which encapsulates the substrate particles and such amount is determinable empirically. Generally, to insure an amount of carbon sufficient for such encapsulation, the organic material should be used in an amount significantly in excess of the substrate particles, i.e. from about a third to about two times the amount of substrate particles. These is no particular limit on the maximum amount of organic material used, but generally it is that amount sufficient to provide a substrate particle of minimum diameter, i.e. about 100 Angstroms or 0.00001 mm with an encapsulating coating or layer of elemental carbon about 10 millimeters in thickness, the maximum diameter of the present adsorbent composite.

A number of techniques can be used to produce a substantially thorough or uniform mixture of the substrate particles and organic material. In one technique the organic material in powder form is admixed with the substrate particles by conventional means such as a milling to form a substantially thorough mixture. In another technique the organic material can be heated to melt it and in molten form it is admixed with the substrate particles by suitable means. Alternatively, the organic material can be dissolved in a solvent and the resulting solution admixed with the substrate particles to form a uniform mixture. In each instance, the resulting mixture is heated to the decomposition temperature of the organic material to yield elemental carbon and the gaseous product or products of decomposition are diffused away. The decomposition is preferably carried out in an oxygen-free atmosphere such as nitrogen. The resulting carbon-substrate particle mass is ground to a predetermined size producing the present flowable adsorbent composite. Grinding of the mass can be carried out by a number of conventional techniques such as by means of dry ball milling. A fine sizing in an air stream will separate any low-density material, i.e., carbon without the high density core.

On decomposition of the organic material, elemental carbon is produced which adheres or bonds itself to the surface of the substrate particle and which usually is sufficiently activated to be useful as an adsorbent. The bond between the substrate surface and elemental carbon is sufficiently strong so that the composite can be handled for gas and liquid adsorption applications without significant loss of activated carbon. The extent to which the carbon is activated varies largely with the particular organic material being decomposed. In the present invention by a sufficiently activated carbon to be useful it is meant an activated carbon having a minimum surface area of about 200 square meters per gram as measured by means of a gas adsorption or in iodine number of at least about 50. Such large surface areas indicate a porous structure which provides the adsorption means. If desired the present adsorbent composite can be treated by a number of techniques to increase its activation, or if necessary to activate it. One such technique is to heat the adsorbent composite in steam at a temperature of about 800° C.

The adsorbent composite is composed of a substrate particle ranging in size from about 100 Angstroms or 0.00001 millimeter to about 10 millimeters in diameter which is encapsulated or substantially encapsulated with activated carbon in an amount or thickness ranging from about 10 millimeters to about 100 Angstroms. Although the maximum size of the substrate particle appears to overlap with the maximum size of the adsorbent composite this is not so since a substrate particle about 10 millimeters in diameter encapsulated with a coating of elemental carbon about 100 Angstroms or 0.00001 millimeter in diameter would result in an adsorbent composite about 10.00001 millimeters in diameter which in the art is considered equivalent to a diameter of about 10 millimeters.

The size and the weight or density of the present adsorbent composite depends on its particular application. It has a minimum specific gravity of about 2.0 and can range from about one micron or 0.001 millimeter to about 10 millimeters in diameter, but generally for most applications, it ranges from about 5 microns to about 5 millimeters in diameter. The present adsorbent composite can be a single particle composed of substrate particle encapsulated or substantially encapsulated with activated carbon. When substrate particles ranging from about 100 Angstroms to about 4 millimeters in diameter are used, the composite is frequently a cluster composed of a plurality of substrate particles distributed in a matrix of activated carbon with the substrate particles within the matrix usually being totally encapsulated whereas those at the edge of the cluster usually being substantially encapsulated by the carbon matrix.

In contrast to powdered carbon which settles very slowly, the present adsorbent composite of equivalent size settles rapidly. Specifically, the present adsorbent can provide the same rate of adsorption as powdered carbon and can be recovered without flocculation and without major provisions for settling.

The present heavier adsorbent composite is particularly useful as an adsorption bed in a column for both upflow and downflow operation utilizing flow rates which would be excessive for granular carbon of the same size resulting in faster adsorption rates in significantly shorter periods of time. For example, when the flow of water upwardly through the granular carbon bed into a column is increased to a certain critical velocity, it fluidizes the bed washing it out of the column and to discharge. With the present tailorable adsorbent composite, the critical velocity for granular carbon of the same size can be significantly exceeded without fluidization or loss of the bed.

For a given size of adsorbent composite, adjustment of the substrate or core/carbon weight ratio will not only change the specific density or gravity of the adsorbent composite but also its adsorption capacity. Specifically, an increase in the proportion of carbon increases the adsorption capacity of the adsorbent composite whereas an increase in the proportion of the substrate, i.e. weighing agent, increases the specific density and therefore the settling rate of the resulting composite.

The present tailorable adsorbent composite is useful as an adsorbent for gaseous, liquid or dissolved contaminants in gaseous or liquid systems. Specifically, the present adsorbent composite with particularly high adsorption capacity is one with as fine a size as possible since the smaller the particle size the larger is the surface area available for adsorption.

After the present composite is used, its adsorption properties can be regenerated by methods available for regeneration of regular powdered or granular activated carbon. In one such method the carbon sludge is dropped through a countercurrent hot air and the adsorbed impurities are burned off. Regeneration can also be carried out biologically.

The present invention is further illustrated by the following example.

EXAMPLE

In this example hematite, an iron oxide ore with a specific gravity of about 5.0 and "steep asphalt", a high molecular weight tar which is a solid at room temperature and which decomposes at atmospheric pressure at temperatures ranging from about 400° C. to about 700° C. to yield elemental carbon and gaseous products of decomposition, were used to prepare the present adsorbent composite.

To 20.0 grams of "steep asphalt" dissolved in about 80 ml of benzene, there was added, with stirring, 20.0 grams of the iron oxide ore having a submicron particle size. The benzene was evaporated slowly on a hot plate and the residue stirred well to disperse the particles uniformly. The resulting mixture was carbonized in a tube furnace wherein all heating was carried out at atmospheric pressure in a stream of nitrogen flowing at one cubic foot per minute observing the following regimen: the mixture was heated overnight at 250° C., then the temperature was raised to 700° C. over a period of 5 hours. It was held at 700° C. for 8 hours, and cooled in the stream of nitrogen. The carbonaceous mass was ground in a mortar to a size of about 0.01 millimeters in diameter.

The resulting composite was composed of clusters and was flowable. Each cluster had a plurality of the iron oxide substrate particles distributed in a matrix of elemental carbon. Only the iron oxide particles at the edge of the cluster were not totally encapsulated with carbon but were considered to be substantially encapsulated whereas all of the remaining iron oxide substrate particles within the carbon matrix were totally encapsulated with elemental carbon.

The activity of the elemental carbon was determined by means of iodine number and was found to be about 1100.

Iodine Number was determined according to the procedure of Culp and Culp disclosed in Advanced Waste Water Treatment, Van Nostrand Reinhold Co., 1971, pp. 249–255.

The following cited copending patent applications are, by reference, made part of the disclosure of the present application.

In copending U.S. Patent application, Ser. No. 726,960, entitled "Magnetic Adsorbent Composite" filed Sept. 27, 1976 in the names of George M. J. Slusarczuk and Ronald E. Brooks and assigned to the assignee hereof, there is disclosed a magnetic adsorbent composite composed of a magnetic substrate particle which is non-reactive under conditions of use and which is encapsulated with adherent activated carbon.

In copending U.S. Patent application, Ser. No. 726,962 entitled "Magnetic Adsorbend And Flocculant" filed filed Sept. 26, 1976, now abandoned in favor of Ser. No. 830,115 filed Sept. 2, 1977 in the names of George M. J. Slusarczuk and Ronald E. Brooks and assigned to the assignee hereof, there is disclosed a method for simultaneous removal of soluble and insoluble impurities from polluted liquids by adding thereto a magnetic adsorbent composite powder which adsorbs soluble organic impurities and a flocculant which flocculates suspended solid impurities and the magnetic powder and magnetically settling the flocculated mixture.

In copending U.S. Patent application, Ser. No. 726,961 entitled "Ferrite Flocculating System" filed filed Sept. 27, 1976 now U.S. Pat. No. 4,193,866 in the names of George M. J. Slusarczuk and Ronald E. Brooks and assigned to the assignee hereof, there is disclosed a method for removal of insoluble suspended impurities from polluted liquids by adding thereto a magnetic ferrite powder suspendible therein and a polyethyleneimine flocculant which flocculates suspended solid impurities and the magnetic powder producing a dense flocculated mixture.

What is claimed is:

1. A process for producing an adsorbent composite having a minimum specific gravity of about 2.0 consisting essentially of substrate particle at least substantially encapsulated with activated carbon, said activated carbon having a minimum surface area of about 200 square meters per gram and being adherently bonded to said substrate particle, which consists essentially of providing a substrate particle having a minimum specific gravity of about 2.0 and a particle size ranging from about 100 Angstroms to about 10 millimeters in diameter, providing an organic material which is a solid at room temperature and which at a temperature ranging from about 50° C. to about 1000° C. at atmospheric pressure decomposes to yield elemental carbon and gaseous product of decomposition, admixing a plurality of said substrate particles with said organic material to form a substantially uniform mixture, heating said mixture in a substantially oxygen-free atmosphere to decompose said organic material yielding elemental carbon and gaseous product of decomposition, and grinding the resulting carbon-substrate particle mass to produce said composite of a predetermined size ranging from about one micron to about 10 millimeters in diameter.

2. A process according to claim 1 wherein said substrate particle has a size ranging from about 100 Angstroms to about 4 millimeters.

3. A process according to claim 2 wherein said adsorbent composite ranges in size from about 5 microns to about 5 millimeters in diameter.

4. A process according to claim 1 wherein said organic material is steep asphalt.

5. A process according to claim 1 wherein said substrate particle is a metal.

6. A process according to claim 1 wherein said substrate particle is a metal alloy.

7. An adsorbent composite having a minimum specific gravity of 2.0 and ranging in diameter from about one micron to about 10 millimeters and consisting essentially of an inert substrate particle with a minimum specific gravity of 2.0 and ranging in diameter from about 100 Angstroms to about 10 millimeters, said substrate particle being at least substantially encapsulated with activated carbon in a thickness ranging from about 100 Angstroms to about 10 millimeters, said activated carbon having a minimum surface area of about 200 square meters per gram and being adherently bonded to said substrate particle.

8. An adsorbent composite according to claim 7 wherein said substrate particle ranges in diameter from about 100 Angstroms to about 4 millimeters and a plurality of said substrate particles are distributed in a matrix of said activated carbon.

9. An adsorbent composite according to claim 8 wherein said substrate particle is a metal.

10. An adsorbent composite according to claim 8 wherein said substrate particle is a metal alloy.

11. An adsorbent composite according to claim 7 wherein said substrate particle is a metal.

12. An adsorbent composite according to claim 7 wherein said substrate particle is a metal alloy.

* * * * *